(12) United States Patent
Kang et al.

(10) Patent No.: US 10,510,320 B2
(45) Date of Patent: Dec. 17, 2019

(54) DISPLAY APPARATUS

(71) Applicant: LG ELECTRONICS INC., Seoul (KR)

(72) Inventors: Moonsoo Kang, Seoul (KR); Wooyoung Jung, Seoul (KR); Bongseok Kim, Seoul (KR); Wontae Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 105 days.

(21) Appl. No.: 15/815,472

(22) Filed: Nov. 16, 2017

(65) Prior Publication Data
US 2018/0137839 A1    May 17, 2018

(30) Foreign Application Priority Data

Nov. 17, 2016 (KR) .......................... 10-2016-0153487

(51) Int. Cl.
*G09G 5/10* (2006.01)
*G06F 3/14* (2006.01)

(52) U.S. Cl.
CPC ............. *G09G 5/10* (2013.01); *G06F 3/1446* (2013.01); *G06F 3/1431* (2013.01); *G06F 3/1438* (2013.01); *G09G 2320/0233* (2013.01); *G09G 2320/0261* (2013.01); *G09G 2320/0626* (2013.01); *G09G 2320/0686* (2013.01)

(58) Field of Classification Search
CPC ............. G09G 2320/0233; G09G 5/10; G09G 2320/0261; G09G 2320/0626; G09G 2320/0686; G06F 3/1446; G06F 3/1438; G06F 3/143
See application file for complete search history.

(56) References Cited

U.S. PATENT DOCUMENTS

| | | | | |
|---|---|---|---|---|
| 2012/0268350 A1* | 10/2012 | Yoshimura | ........... | G09G 3/3426 345/1.3 |
| 2013/0314458 A1 | 11/2013 | Murai et al. | | |
| 2013/0335390 A1 | 12/2013 | Ishibashi et al. | | |
| 2016/0132282 A1* | 5/2016 | Choi | ...................... | G09G 5/006 345/1.3 |

FOREIGN PATENT DOCUMENTS

EP    1453033    9/2004

OTHER PUBLICATIONS

European Patent Office Application Serial No. 17202321.0, Search Report dated Mar. 15, 2018, 10 pages.

* cited by examiner

*Primary Examiner* — Muhammad N Edun
(74) *Attorney, Agent, or Firm* — Lee, Hong, Degerman, Kang & Waimey PC

(57) ABSTRACT

A display apparatus includes a plurality of displays arranged adjacently, an image divider configured to divide an original input image into a plurality of sub-images for displaying the original input image split between the plurality of displays, wherein one or more of the plurality of sub-images corresponds to one or more still images and one or more of the plurality of sub-images corresponds to one or more moving images, and at least one controller configured to cause the one or more still images and the one or more moving images to be displayed with a first luminance value based on luminance values corresponding to the plurality of sub-images of each display of the plurality of displays. Accordingly, it is possible to improve image quality in the display apparatus including the plurality of displays.

19 Claims, 21 Drawing Sheets

DISPLAY APPARATUS

CROSS-REFERENCE TO RELATED APPLICATION

Pursuant to 35 U.S.C. § 119(a), this application claims the benefit of earlier filing date and right of priority to Korean Patent Application No. 10-2016-0153487, filed on Nov. 17, 2016, the contents of which are hereby incorporated by reference herein in its entirety.

BACKGROUND OF THE INVENTION

1. Field of the invention

The present invention relates to a display apparatus, and more particularly, to a display apparatus including a plurality of displays, which is capable of improving image quality.

2. Description of the Related Art

A display apparatus outputs an image. The display apparatus may output an image using various methods, that is, may output an image through a display panel or project an image using visible light.

Meanwhile, commercial display apparatuses have been widely mounted outdoors.

In particular, in a commercial display apparatus, a plurality of displays is contiguously provided.

A phenomenon wherein luminance of a region adjacent to a bezel surrounding a display is lower than that of a central region of the display occurs. In particular, this phenomenon increases when a plurality of displays is contiguously arranged.

SUMMARY OF THE INVENTION

Therefore, the present invention has been made in view of the above problems, and it is an object of the present invention to provide a display apparatus including a plurality of displays, which is capable of improving image quality.

In accordance with an aspect of the present invention, the above and other objects can be accomplished by the provision of a display apparatus comprising a plurality of displays arranged adjacently, an image divider configured to divide an original input image into a plurality of sub-images for displaying the original input image split between the plurality of displays, wherein one or more of the plurality of sub-images corresponds to one or more still images and one or more of the plurality of sub-images corresponds to one or more moving images, and at least one controller configured to cause the one or more still images and the one or more moving images to be displayed with a first luminance value based on luminance values corresponding to the plurality of sub-images of each display of the plurality of displays.

According to another aspect of the present invention, there is provided a display apparatus including a plurality of displays arranged adjacently, an image divider configured to divide an original input image into a plurality of sub-images for displaying the original input image split between the plurality of displays, and at least one controller configured to cause the plurality of sub-images to be displayed with a first luminance value when a maximum variance between a first average luminance value of sub-images corresponding to a first display of the plurality of displays and a second average luminance value of sub-images corresponding to a second display of the plurality of displays is greater than or equal to a threshold reference value.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Reference will now be made in detail to the preferred embodiments of the present invention, examples of which are illustrated in the accompanying drawings.

The suffixes "module" and "unit" in elements used in description below are given only in consideration of ease in preparation of the specification and do not have specific meanings or functions. Therefore, the suffixes "module" and "unit" may be used interchangeably.

Figure 1:
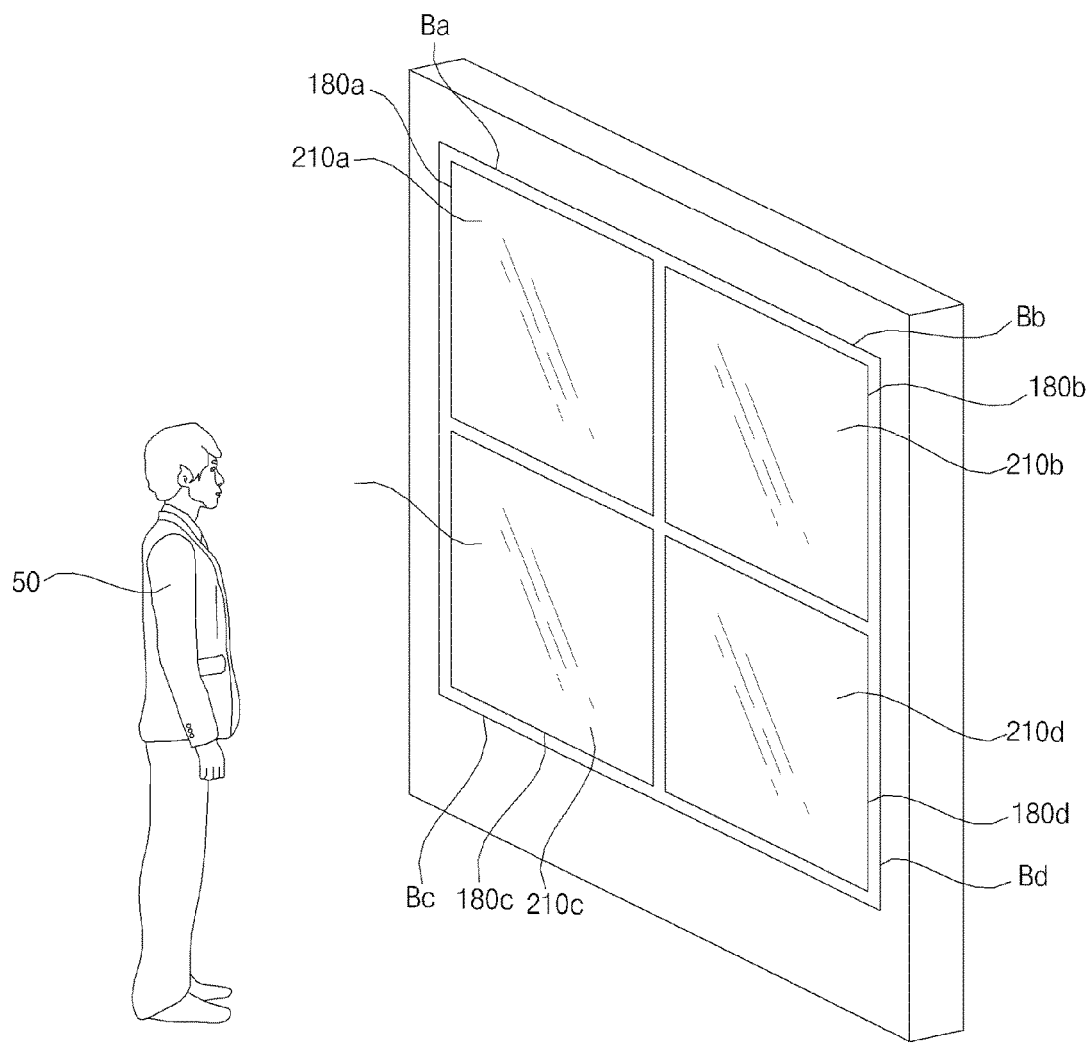
FIG. 1 is a diagram showing the appearance of a display apparatus according to an embodiment of the present invention.

FIG. 1 is a diagram showing the appearance of a display apparatus according to an embodiment of the present invention.

Referring to FIG. 1, the display apparatus 10 may be provided outdoors in public places.

For example, the display apparatus 10 may be provided in public places such as vehicles, bus terminals, railroad stations and airports, in order to provide information such as advertisements, news and notices. In addition, the display apparatus may be provided near display windows of department stores, shopping malls or markets, for advertisements of specific products.

The display apparatus 10 may include a plurality of displays 180a to 180d arranged contiguously.

The plurality of displays 180a to 180d may include a plurality of panels 210a to 210d and bezels Ba to Bd surrounding the panels 210a to 210d, respectively.

In the figure, the display apparatus 10 includes a plurality of image display apparatuses 100a to 100d including the plurality of displays 180a to 180d. The plurality of image display apparatuses 100a to 100d may include a plurality of controllers 170a to 170d in addition to the plurality of displays 180a to 180d.

For example, in the display apparatus 10, images divided by an image divider 160 may be input to the controllers 170a to 170d respectively included in the plurality of image display apparatuses 100a to 100d and the image signals respectively processed by the controllers 170a to 170d may be input to the displays 180a to 180d. The displays 180a to 180d may display the images.

A viewer 50 can view the images displayed through the display apparatus 10 as shown in the figure. In particular, the viewer can view the images displayed through the plurality of displays 180a to 180d.

As another example, the display apparatus 10 may include one controller (170 of FIG. 13) for commonly controlling the plurality of image display apparatuses 100a to 100d. The controller (170 of FIG. 13) may perform signal processing with respect to the displayed image. The images subjected to image processing may be input to the displays 180a to 180d and may be displayed through the displays 180a to 180d.

When the images are respectively displayed through the plurality of displays 180a to 180d, if a difference in luminance between the images occurs, the image quality of the display apparatus 10 may deteriorate. The viewer may recognize image quality deterioration.

In order to solve this problem, the display apparatus 10 according to the embodiment of the present invention includes a plurality of displays 180a to 180d provided contiguously, an image divider 160 for dividing an input image into a plurality of images for display through the plurality of displays 180a to 180d and at least one controller for controlling the plurality of displays 180a to 180d. When some of the plurality of images are still images and another images are moving images, the controller may perform control to set the luminances of the still images and the luminances of the moving images to a first luminance and to display the still images and the moving images with the first luminance, thereby improving the image quality of the display apparatus 10 including the plurality of displays 180a to 180d.

In particular, it is possible to implement uniform luminance on the overall screen of the display apparatus 10.

The plurality of controllers 170a to 170d corresponding to the plurality of displays 180a to 180d may be included. The plurality of controllers 170a to 170d may perform data communication with each other to share luminance information of the plurality of images, thereby setting the same luminance.

The display apparatus 10 according to another embodiment of the present invention includes a plurality of displays 180a to 180d provided contiguously, an image divider 160 for dividing an input image into a plurality of images for display through the plurality of displays 180a to 180d and at least one controller for controlling the plurality of displays 180a to 180d. If a difference between minimum luminance of a first image of the plurality of images and maximum luminance of a second image is equal to or greater than a reference value, the controller may perform control to set the luminances of the plurality of images to first luminance, that is, the same luminance and to display the plurality of images with the first luminance, thereby improving image quality of the display apparatus 10.

For example, when some of the plurality of images are still images and another images are moving images, the controller may perform control to set the images to the same luminance, thereby improving image quality of the display apparatus 10.

As another example, if a logo or text is included in some of the plurality of images and thus a luminance difference is equal to or greater than the reference value, the same luminance is set with respect to the plurality of images, thereby improving image quality of the display apparatus 10.

As another example, if an object having different luminance is included in some of the plurality of images and thus a luminance difference is equal to or greater than the reference value, the plurality of images is displayed with the same luminance, thereby improving image quality of the display apparatus 10.

As another example, if motion information of some of the plurality of images is equal to or greater than a predetermined value and a luminance difference is equal to or greater than the reference value, the plurality of images is displayed with the same luminance, thereby improving image quality of the display apparatus 10.

Although the plurality of displays 180a to 180d is arranged in a 2×2 matrix, the displays may be arranged in a 1×4 or 4×1 matrix. That is, if two or more displays are contiguously arranged, according to the embodiment of the present invention, it is possible to perform control to display the plurality of images with the same luminance even when the plurality of images is different in terms of luminance, thereby improving the image quality of the display 10 including the plurality of displays 180a to 180d.

At least one controller 170a to 170d may cause the one or more still images and the one or more moving images to be displayed with a first luminance value based on luminance values corresponding to the plurality of sub-images of each display of the plurality of displays 180a to 180d.

The plurality of controllers 170a to 170d may exchange luminance information of the corresponding plurality of sub-images.

A first controller 170a of the plurality of controllers 170a to 170d may determine an average luminance value of a first sub-image received from the image divider, cause the determined average luminance value to be provided to the plurality of controllers 170b to 170d excluding the first controller 170a, and receive average luminance information of the plurality of sub-images excluding the first sub-image from the plurality of controllers 170b to 170d excluding the first controller 170a.

The first controller 170a of the plurality of controllers may increase a luminance level of a still image displayed on a first display 180a of the plurality of displays 180a to 180d during a first time period, wherein the luminance level of the still image is increased from an original still image luminance level to the first luminance level, and decrease a luminance level of a moving image displayed on the first display 180a during a second time period following the first time period, wherein the luminance level of the moving image is decreased from an original moving image luminance level to the first luminance level.

The at least one controller 170a to 170d may determine an average luminance value of the one or more moving images in the plurality of sub-images, determine an average luminance value of the one or more still images in the plurality of sub-images, and set a luminance value of the plurality of sub-images to the first luminance value which is less than the determined average luminance value of the one or more moving images when the determined average luminance value of the one or more moving images is greater than the determined average luminance value of the one or more still images.

The at least one controller 170a to 170d may cause the one or more still images to be displayed with a second luminance value before being displayed with the first luminance value, wherein the second luminance value is less than the first luminance value, and cause the one or more moving images to be displayed with a third luminance value before being displayed with the first luminance value, wherein the third luminance value is greater than the first luminance value.

The at least one controller 170a to 170d may determine corresponding average luminance values of sub-images corresponding to each display of the plurality of displays 180a to 180d, and determine a maximum variance between the corresponding average luminance values, wherein the plurality of sub-images are displayed with the first luminance value when the determined maximum variance is greater than or equal to a threshold reference value.

The at least one controller 170a to 170d may cause the sub-images corresponding to the sub-group of displays to be displayed with a graduated luminance increasing toward the first display 180a, wherein a first area within the sub-group of displays positioned distal from the first display 180a is displayed with a second luminance value and a second area within the sub-group of displays positioned proximate to the first display 180a is displayed with a third luminance value, wherein the second luminance value is less than the third luminance value and the third luminance value is less than the first luminance value.

The at least one controller 170a to 170d may cause the plurality of sub-images to be displayed with a first luminance value when a maximum variance between a first average luminance value of sub-images corresponding to a first display 180a of the plurality of displays 180a to 180d and a second average luminance value of sub-images corresponding to a second display 180b of the plurality of displays 180a to 180d is greater than or equal to a threshold reference value.

The at least one controller 170a to 170d may determine presence of an object to be displayed in the sub-images corresponding to the first display 180a, and determine the first average luminance value based on the determined presence of the object to be displayed.

The at least one controller 170a to 170d may determine motion information to be displayed in the sub-images corresponding to the first display 180a, and determine the first average luminance value based on the determined motion information to be displayed.

The at least one controller 170a to 170d may set the first luminance value to a value between a minimum luminance value of the sub-images corresponding to the first display 180a and a maximum luminance value of the sub-images corresponding to the second display 180b.

The at least one controller 170a to 170d may set the first luminance value to a minimum luminance value of the sub-images corresponding to the first display 180a.

The at least one controller 170a to 170d may cause the sub-images corresponding to the sub-group of displays to be displayed with a graduated luminance increasing toward the first display 180a, wherein a first area within the sub-group of displays positioned distal from the first display 180a is displayed with a second luminance value and a second area within the sub-group of displays positioned proximate to the first display 180a is displayed with a third luminance value, wherein the second luminance value is less than the third luminance value and the third luminance value is less than the first luminance value.

The internal structure and operation of the display apparatus 10 will be described in greater detail with reference to FIGS. 2 and 3.

Figure 2:
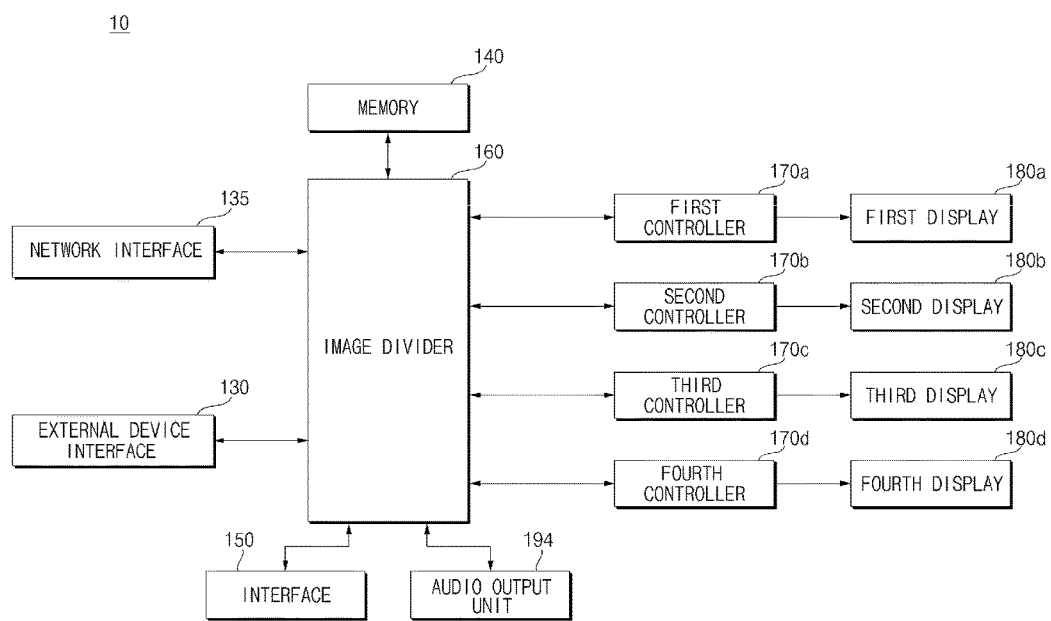
FIG. 2 is a block diagram showing an example of the internal configuration of the image display apparatus of FIG. 1.

FIG. 2 is a block diagram showing an example of the internal configuration of the image display apparatus of FIG. 1.

Referring to the figure, the display apparatus 10 may include an external device interface 130, a network interface 135, a memory 140, an image divider 160, a plurality of controllers 170a to 170d, a plurality of displays 180a to 180d, a power supply 190 and an audio output unit 194.

The external device interface 130 may serve to transmit or receive data to or from an external device (not shown) connected thereto. The external device interface 130 may include an A/V input/output (I/O) unit (not shown) or a data input/output module (not shown).

For example, the external device interface 130 may include an HDMI port, an RGB port, a component port, a USB port, a micro SD port, etc.

The network interface 135 serves as an interface between the image display apparatus 100 and a wired/wireless network such as the Internet. For example, the network interface 135 may receive content or data provided by an Internet or content provider or a network operator over a network.

The memory 140 may store various programs necessary for the controller 170 to process and control signals, and may also store processed video, audio and data signals.

The memory 140 may temporarily store a video, audio and/or data signal received from the external device interface 130.

The plurality of displays 180a to 180d may be contiguously arranged, may include various display panels such as LCDs, OLEDs, PDPs, etc., and may display predetermined images through the display panels.

The user input interface 150 transmits a signal input by the user to the controller 170 or transmits a signal received from the controller 170 to the user.

The user input interface 150 may include a local key including a power key, a touch panel for inputting user information, etc.

The image divider 160 may divide an input image stored in the memory 140 or an input image received from an external device through the external device interface 130 or the network interface 135 into a plurality of images, for displaying the input image through the plurality of displays 180a to 180d.

For example, the image divider 160 may crop the input image into a plurality of images and scale the images.

In particular, the image divider 160 may perform cropping and scaling in consideration of the resolution and size of the plurality of displays 180a to 180d.

The image divider 160 may perform overall control of the display apparatus 10, and, more particularly, control operation of the units of the display apparatus 10.

At least one controller may be provided in order to control the plurality of displays 180a to 180d.

In the figure, the plurality of controllers 170a to 170d corresponding to the plurality of displays 180a to 180d is shown, in order to control the plurality of displays 180a to 180d.

The plurality of controllers 170a to 170d may perform control operation for image display through the plurality of displays 180a to 180d.

When some of the plurality of images are still images and another images are moving images, each of the plurality of controllers 170a to 170d may perform control to set the luminances of the still images and the luminances of the moving images to the same luminance, that is, first luminance, and to display the still images and the moving images with the first luminance.

When the luminances of the moving images of the plurality of images are greater than those of the still images of the plurality of images, each of the plurality of controllers 170a to 170d may perform control to set the luminances of the plurality of images to the first luminance, which are less than the luminances of the moving images.

When the luminances of the moving images of the plurality of images are greater than those of the still images of the plurality of images, each of the plurality of controllers 170a to 170d may perform control to set the luminances of the still image to the first luminance.

Each of the plurality of controllers 170a to 170d may perform data communication with each other to share luminance information of the plurality of images.

Each of the plurality of controllers 170a to 170d may analyze the luminance of the image received from the image divider 160, perform control to transmit average luminance information of the images to another controllers, and receive average luminance information of another images except for the analyzed image of the plurality of images from another controllers.

The first controller 170a of the plurality of controllers 170a to 170d may analyze the luminance of the first image received from the image divider 160, perform control to transmit the average luminance information of the first image to another controllers 170b to 170d, and receive average luminance information of another images except for the first image of the plurality of images from another controllers 170b to 170d.

If a difference between minimum luminance of the first image of the plurality of images and maximum luminance of the second image is equal to or greater than a reference value, each of the plurality of controllers 170a to 170d may perform control to set the luminances of the plurality of images to the same luminance, that is, the first luminance and to display the plurality of images with the first luminance.

When some of the plurality of images are still images and another images are moving images and a difference between minimum luminance of the first image of the plurality of images and maximum luminance of the second image is equal to or greater than a reference value, each of the plurality of controllers 170a to 170d may perform control to set the luminances of the still images and the luminances of the moving images of the plurality of images to the same luminance, that is, the first luminance, and to display the still images and the moving images with the first luminance.

Meanwhile, if a logo or text is included in the first image of the plurality of images and a difference between minimum luminance of the first image of the plurality of images and maximum luminance of the second image is equal to or greater than a reference value, each of the plurality of controllers 170a to 170d may perform control to set the luminances of the plurality of images including the first image and the second image to the same luminance, that is, the first luminance, and to display the plurality of images with the first luminance.

Meanwhile, if an object with luminance different from that of another images is included in the first image of the plurality of images and a difference between minimum luminance of the first image of the plurality of images and maximum luminance of the second image is equal to or greater than a reference value, each of the plurality of controllers 170a to 170d may perform control to set the luminances of the plurality of images including the first image and the second image to the same luminance, that is, the first luminance, and to display the plurality of images with the first luminance.

Meanwhile, if motion information of the first image of the plurality of images is equal to or greater than a predetermined value and a difference between minimum luminance of the first image of the plurality of images and maximum luminance of the second image is equal to or greater than a reference value, each of the plurality of controllers 170a to 170d may perform control to set the luminances of the plurality of images including the first image and the second image to the same luminance, that is, the first luminance, and to display the plurality of images with the first luminance.

Meanwhile, each of the plurality of controllers 170a to 170d may set the first luminance to a value between the minimum luminance of the first image and the maximum luminance of the second image or the minimum luminance of the first image.

Each of the plurality of controllers 7170a to 170d may control the plurality of displays 180a to 180d to output a predetermined image. More specifically, RGB signals corresponding to a video image to be displayed may be output through the plurality of displays 180a to 180d. Thus, the plurality of displays 180a to 180d may display respective images.

The power supply 190 may receive external or internal power and supply power necessary for operation of the components.

The power supply 190 supplies power to the image display apparatus 100 and, more particularly, the plurality of controllers 170a to 170d implemented in the form of a system on chip (SOC), the plurality of displays 180a to 180d for displaying video, and the audio output unit 194 for outputting audio.

A temperature sensor (not shown) may sense the temperature of the display apparatus 10.

The temperature sensed by the temperature sensor (not shown) may be input to the plurality of controllers 170a to 170d or the image divider 160, which may control operation of a fan driving unit (not shown) in order to reduce internal heat based on the sensed temperature.

Figure 3:
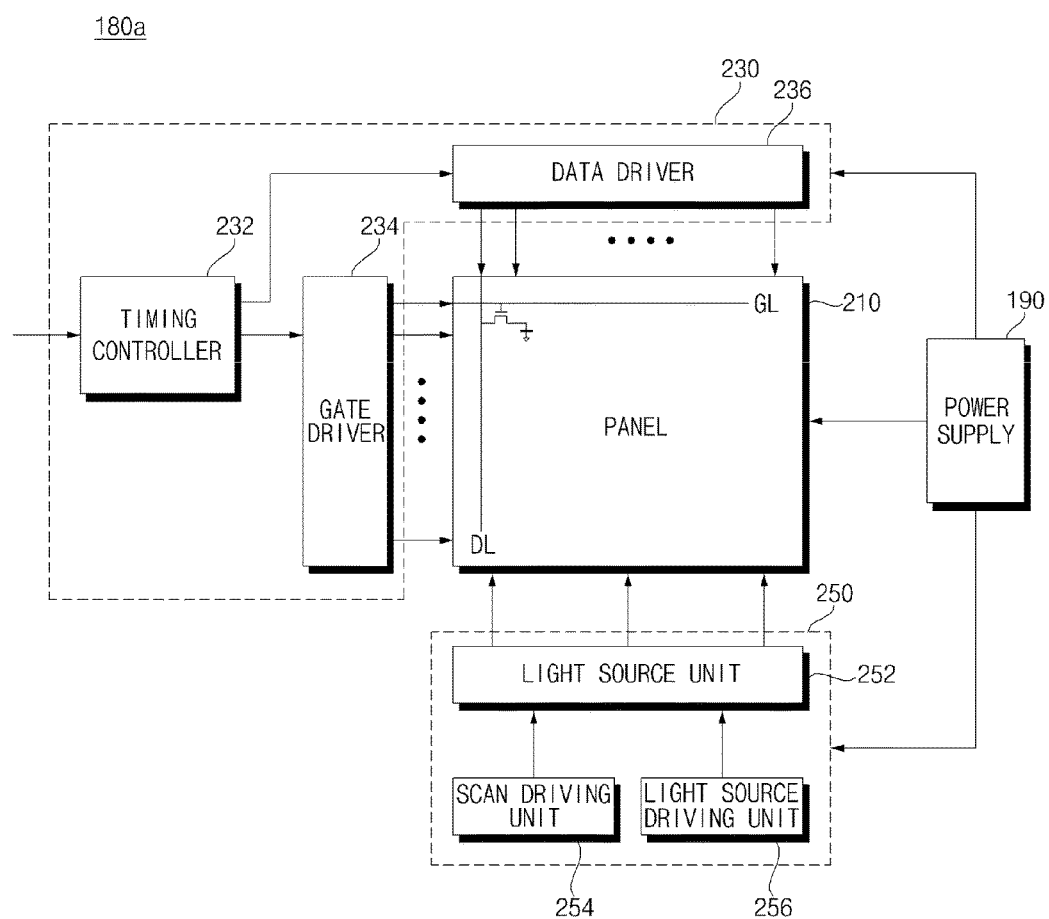
FIG. 3 is a block diagram showing an example of the internal configuration of the first display of FIG. 2.

FIG. 3 is a block diagram showing an example of the internal configuration of the first display of FIG. 2.

Referring to the figure, the first display 180a based on a liquid crystal display (LCD) panel may include an LCD panel 210, a driving circuit 230 and a backlight unit 250.

The LCD panel 210 includes a first substrate, on which a plurality of gate lines GL and data lines DL is arranged in a matrix to intersect each other and thin film transistors and pixel electrodes connected thereto are formed at intersections, a second substrate, on which a common electrode is formed, and a liquid crystal layer formed between the first substrate and the second substrate.

The driving circuit 230 drives the LCD panel 210 through control signals and data signals received from the first controller 170a of FIG. 2. To this end, the driving circuit unit 230 includes a timing controller 232, a gate driver 234 and a data driver 236.

The timing controller 232 receives a control signal, RGB data signals, a vertical synchronization signal Vsync, etc. from the controller 170, controls the gate driver 234 and the data driver 236 in correspondence with the control signal and rearranges and provides the RGB data signals to the data driver 236.

A scan signal and a video signal are supplied to the LCD panel 210 through the gate lines GL and the data lines DL, under control of the gate driver 234, the data driver 236 and the timing controller 232.

The backlight unit 250 supplies light to the LCD panel 210. To this end, the backlight unit 250 may include a light source unit 252 including a plurality of light sources, a scan driving unit 254 for controlling scanning of the light source unit 252 and a light source driving unit 256 for turning the light source unit 252 on/off.

In a state of adjusting light transmissivity of the liquid crystal layer by an electric field formed between the pixel electrodes and the common electrode of the LCD panel 210, a predetermined image is displayed using light emitted from the backlight unit 250.

The power supply 190 may supply a common electrode voltage Vcom to the liquid crystal panel 210 and supply a gamma voltage to the data driver 236. In addition, driving power for driving the light source unit 252 may be supplied to the backlight unit 250.

Figure 4:
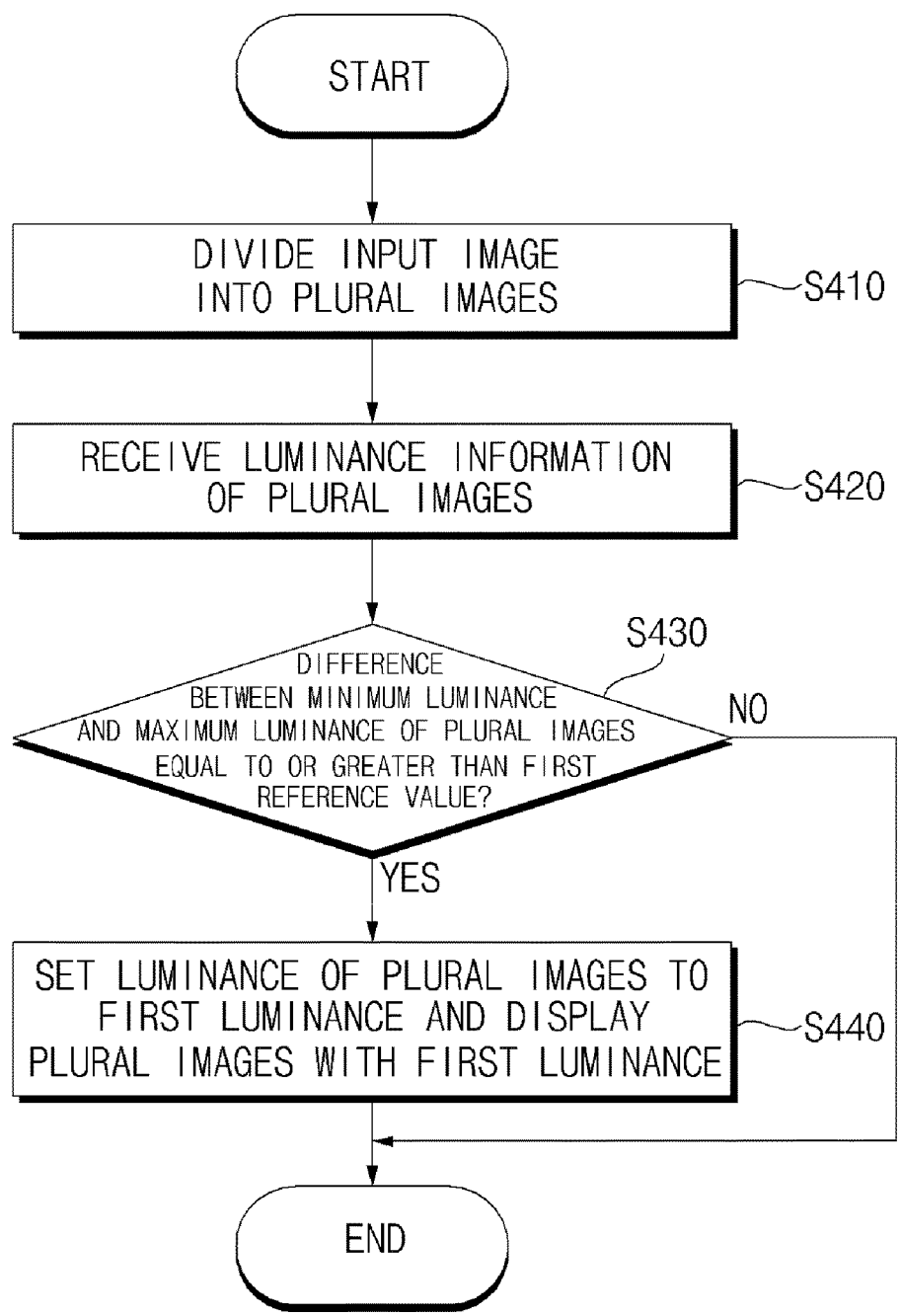
FIG. 4 is a flowchart illustrating a method of operating a display apparatus according to an embodiment of the present invention.

FIG. 4 is a flowchart illustrating a method of operating a display apparatus according to an embodiment of the present invention.

Referring to the figure, the image divider 160 of the display apparatus 10 divides an input image into a plurality of images (S410).

The image divider 160 may crop the input image into a plurality of images and scale the images.

For example, as shown in FIG. 1, if four displays 180a to 180d are arranged in a 2×2 matrix, the image divider 160 may distribute the left upper area of the input image as a first image, for display through the first display 180a.

Similarly, the image divider 160 may distribute the right upper area of the input image as a second image, for display through the second display 180b, distribute the left lower area of the input image as a third image, for display through the third display 180c, and distribute the right lower area of the input image as a fourth image, for display through the fourth display 180d.

The plurality of divided images may be input to the plurality of controllers 170a to 170d.

Each of the plurality of controllers 170a to 170d may analyze the luminance of the image divided by the image divider 160 and calculate the average luminance information of the image.

The plurality of controllers 170a to 17d may perform data communication with each other and share the luminance information of the plurality of images.

Each of the plurality of controllers 170a to 170d receives the luminance information of each of the plurality of divided images (S420).

Each of the plurality of controllers 170a to 170d compares the luminances of the plurality of images and determines whether a difference between minimum luminance and maximum luminance is equal to or greater than a first reference value (S430).

If a difference in luminance between the first image with minimum luminance of the plurality of images and the second image with maximum luminance is equal to or greater than the first reference value, each of the plurality of controllers 170a to 170d performs luminance correction of the plurality of images, in order to prevent image quality deterioration of the images displayed through the plurality of displays and, particularly, to reduce a luminance difference.

That is, if the difference between the minimum luminance and the maximum luminance is equal to or greater than the first reference value, each of the plurality of controllers 170a to 170d may perform control to set the luminances of the plurality of images including the first image and the second image to the first luminance and to display the plurality of images with the first luminance through the plurality of displays 180a to 180d (S440).

Thus, it is possible to prevent image quality deterioration of the images displayed through the plurality of displays and, particularly, to reduce a luminance difference. Accordingly, the viewer can view the image with high image quality and, particularly, with improved luminance, through the plurality of displays.

The first reference value may be in a range from 30 to 50 level if the average luminance level is any one of 0 to 255 level, but may be variously changed.

As an example of the case where the difference between the minimum luminance of the first image and the maximum luminance of the second image is equal to or greater than the first reference value, the first image may be a still image and the second image may be a moving image. This will be described in greater detail with reference to FIGS. 5 to 6e.

As another example of the case where the difference between the minimum luminance of the first image and the maximum luminance of the second image is equal to or greater than the first reference value, a logo or text may be included in the first image. This will be described in greater detail with reference to FIGS. 7 to 8b.

As another example of the case where the difference between the minimum luminance of the first image and the maximum luminance of the second image is equal to or greater than the first reference value, an object having different (low) luminance may be included in the first image. This will be described in greater detail with reference to FIGS. 9 to 10b.

As another example of the case where the difference between the minimum luminance of the first image and the maximum luminance of the second image is equal to or greater than the first reference value, motion information of the first image may be equal to or greater than a predetermined value. This will be described in greater detail with reference to FIGS. 11 to 12b.

Figure 5:
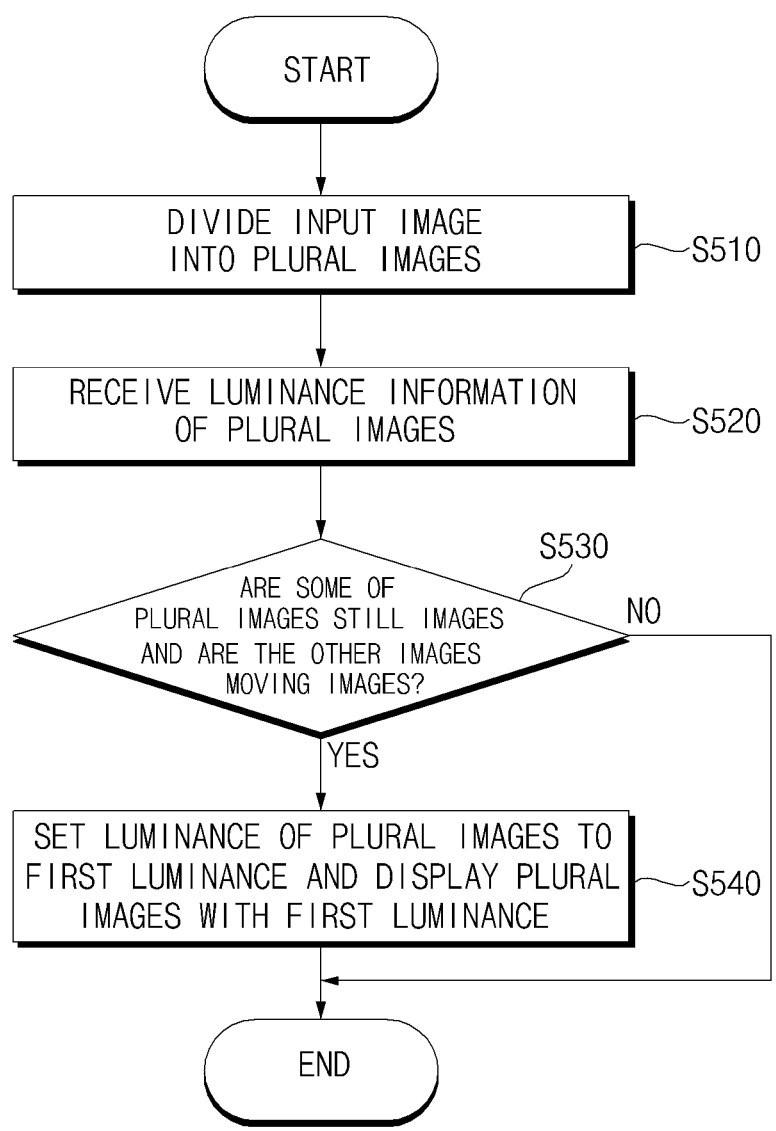
FIG. 5 is a flowchart illustrating a method of operating a display apparatus according to an embodiment of the present invention.

FIG. 5 is a flowchart illustrating a method of operating a display apparatus according to an embodiment of the present invention, and FIGS. 6a to 6e are views referred to for describing operation of the display apparatus of FIG. 5.

Referring to the figure, the image divider 160 of the display apparatus 10 divides an input image into a plurality of images (S510).

The image divider 160 may crop the input image into a plurality of images and scale the images.

The plurality of divided images may be input to the plurality of controllers 170a to 170d.

Each of the plurality of controllers 170a to 170d may analyze the luminance of the image divided by the image divider 160 and calculate the average luminance information of the image.

The plurality of controllers 170a to 17d may perform data communication with each other and share the luminance information of the plurality of images.

Each of the plurality of controllers 170a to 170d receives the luminance information of each of the plurality of divided images (S520).

Each of the plurality of controllers 170a to 170d determines whether some of the plurality of images are still images and another images are moving images (S530).

When some of the plurality of images are still images and another images are moving images, the luminances of the still images and the luminances of the moving images may be different.

Figure 6A:
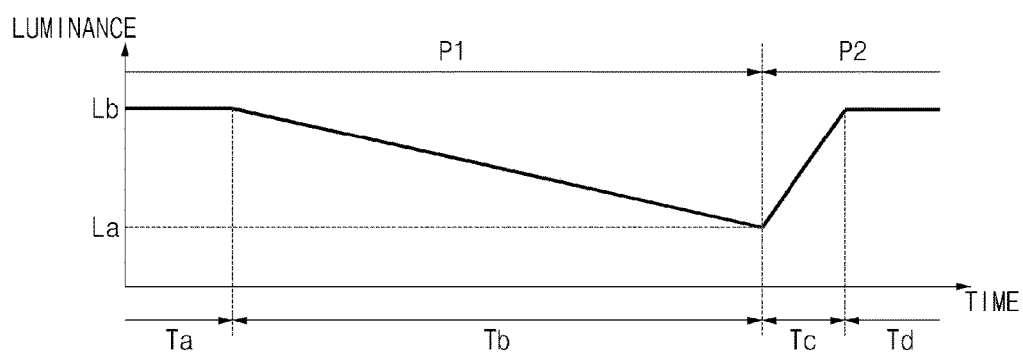
FIGS. 6a to 6e are views referred to for describing operation of the display apparatus of FIG. 5.

FIG. 6a shows luminance change when a still image is displayed in a period P1 and a moving image is displayed in a period P2.

If the still image is displayed with luminance Lb in a period Ta of the period P1 and then is continuously displayed in a period Tb, the luminance of the still image may be sequentially decreased from Lb to La, for reduction of power consumption. As shown in the figure, the luminance may be gradually decreased to La.

After the period Tb, if a moving image is displayed, a period Tc in which the luminance is gradually increased may be provided.

Then, the moving image with luminance Lb may be displayed in the period Td of the period P2.

Figure 6B:
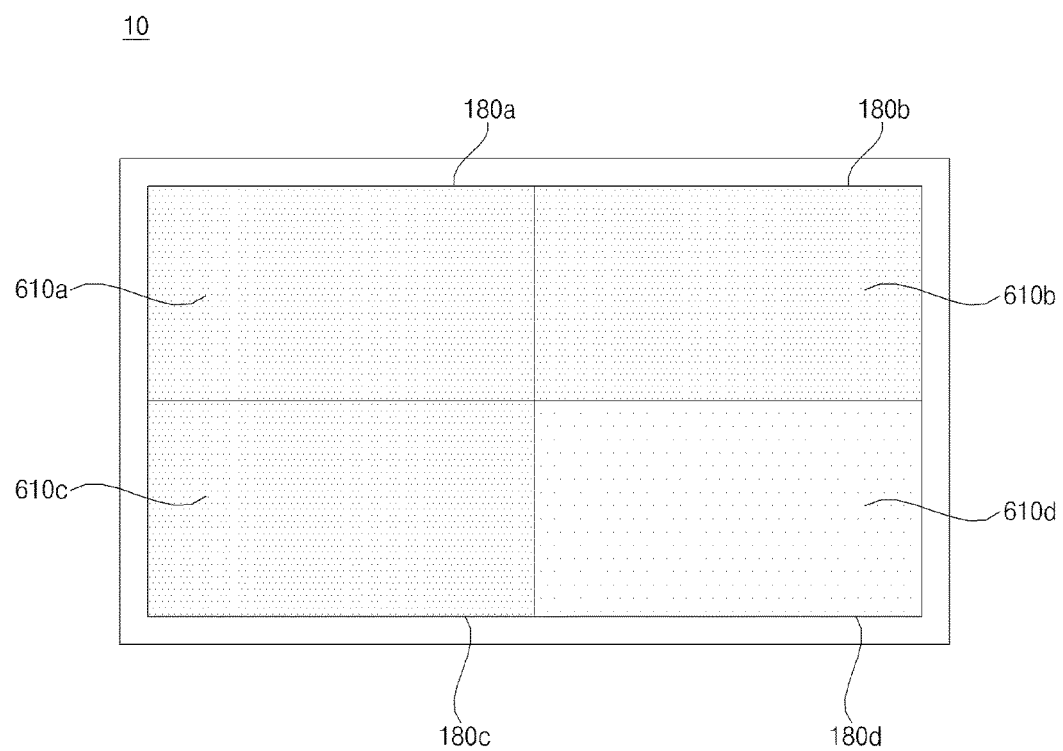

FIG. 6b shows the case where still images 610a to 610c are displayed through the first to third displays 180a to 180c of the plurality of displays 180a to 180d and a moving image 610d is displayed through the fourth display 180d.

As shown in FIG. 6a, if the still image is displayed through the first to third displays 180a to 180c for a predetermined time, the still image with luminance La may be displayed, and the moving image with luminance Lb greater than the luminance La may be displayed through the fourth display 180d.

By such luminance difference, image quality may deteriorate upon viewing the image through the display apparatus 10.

In the present invention, in order to reduce the image quality deterioration phenomenon, it is possible to perform control to display the plurality of images displayed through the plurality of displays 180a to 180d with the same luminance.

That is, when some of the plurality of images are still images and another images are moving images, each of the plurality of controllers 170a to 170d may perform control to set the luminances of the still images and the luminances of the moving images of the plurality of images to the same luminance, that is, the first luminance, and to display the still images and the moving images with the first luminance.

Figure 6C:
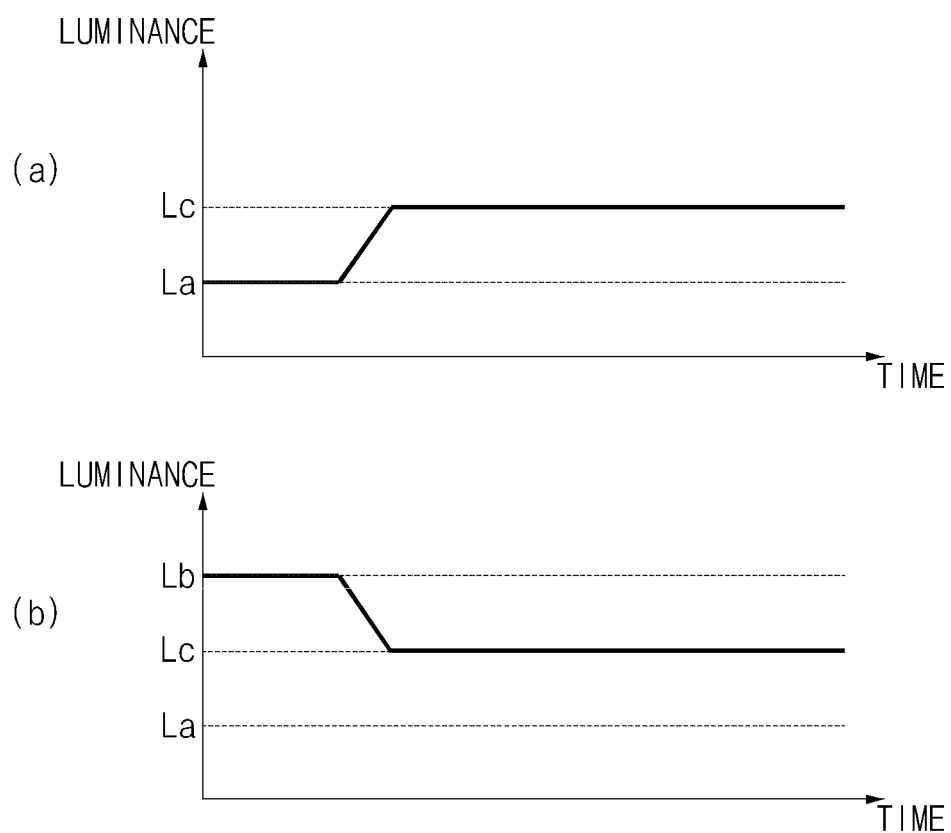

For example, if the luminance Lb of the moving images of the plurality of images is greater than the luminance La of the still images of the plurality of images, as shown in FIG. 6c, each of the plurality of controllers 170a to 170d may perform control to set the luminances of the plurality of images to first luminance Lc lower than those of the moving images.

(a) of FIG. 6c shows the case in which the luminances of the still images are increased from La to the first luminance Lc and (b) of FIG. 6c shows the case in which the luminances of the moving images are decreased from Lb to the first luminance Lc. Thus, the plurality of images may be displayed through the plurality of displays 180a to 180d with the same luminance.

Figure 6D:
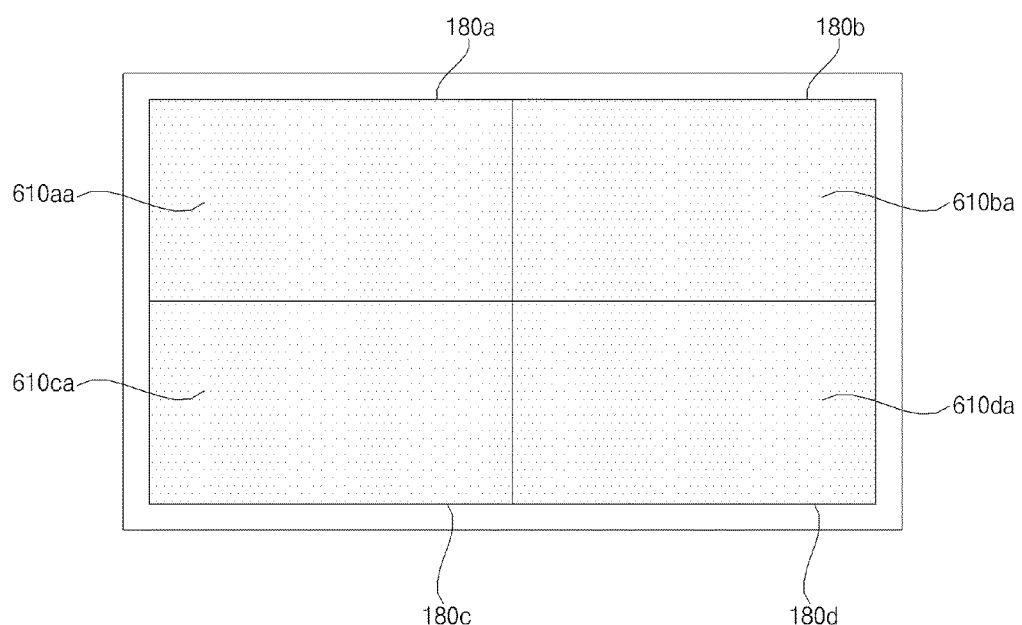

As a result, as shown in FIG. 6d, the display apparatus 10 may display the still images 610aa to 610ca with luminance increased as compared to FIG. 6b through the first to third displays 180a to 180c and display the moving image with luminance decreased as compared to FIG. 6b through the fourth display 180d.

Figure 6E:
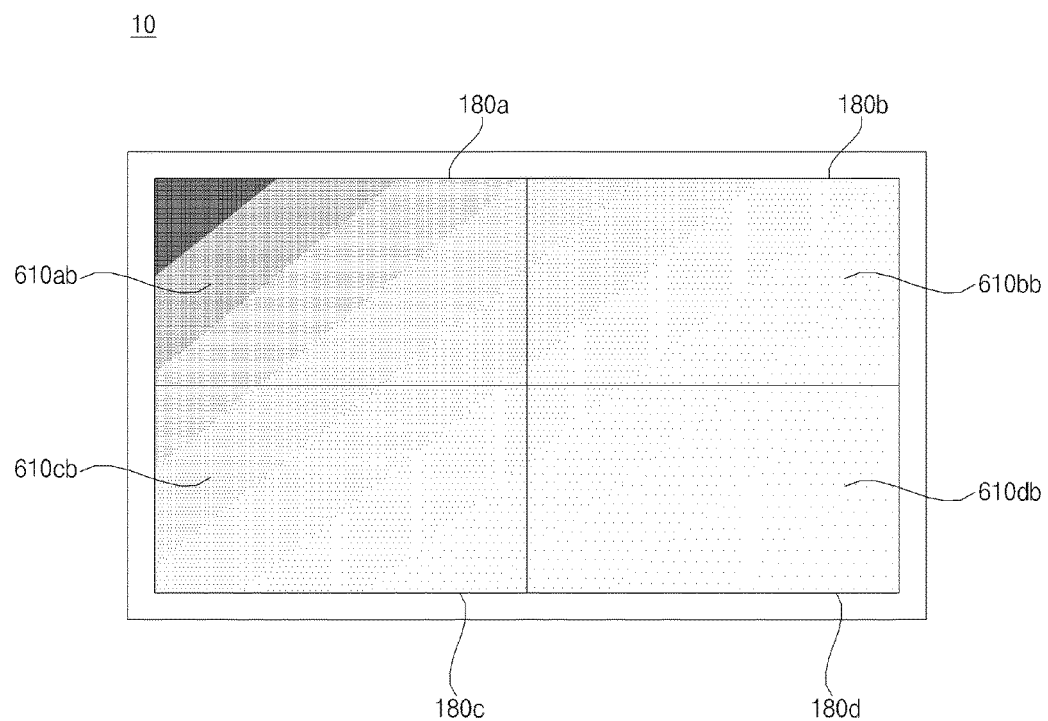

Meanwhile, in order to reduce the difference in luminance between the still images and the moving images, in addition to display of the images with the same luminance, as shown in FIG. 6e, the luminance of another still images may be sequentially decreased from the high luminance of the moving image. That is, the luminance of the images may be decreased by gradation.

That is, FIG. 6e shows the case where the luminances of the still images 610ab to 610cb displayed through the first to third displays 180a to 180c are sequentially decreased and the moving image 610db with the first luminance is displayed through the fourth display 180d.

When the luminances of the moving images of the plurality of images are greater than those of the still images of the plurality of images, the luminances of the still images may be set to the first luminance.

Meanwhile, by the above luminance control, the first to third displays 180a to 180c of the plurality of displays 180a to 180d may display the still images with the second luminance less than the first luminance and then display the still images with the first luminance and the fourth display 180d of the plurality of displays 180a to 180d may display the moving image with third luminance greater than the first luminance and then display the moving image with the first luminance.

That is, the images 610a to 610d of FIG. 6b may be displayed and then the images 610aa to 610da may be displayed after a predetermined time.

Unlike, the images 610aa to 610da of FIG. 6d may be immediately displayed through luminance control, without displaying the images 610a to 610d of FIG. 6b.

Figure 7:
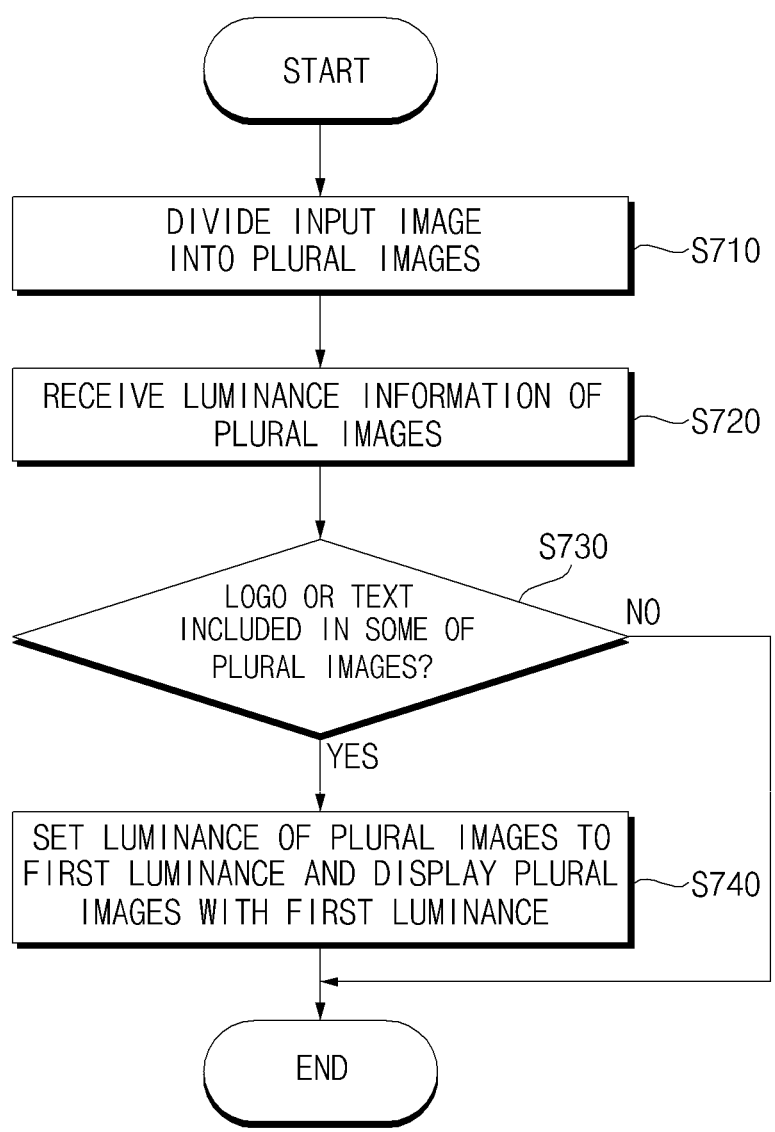
FIG. 7 is a flowchart illustrating a method of operating a display apparatus according to another embodiment of the present invention.
Figure 8A:
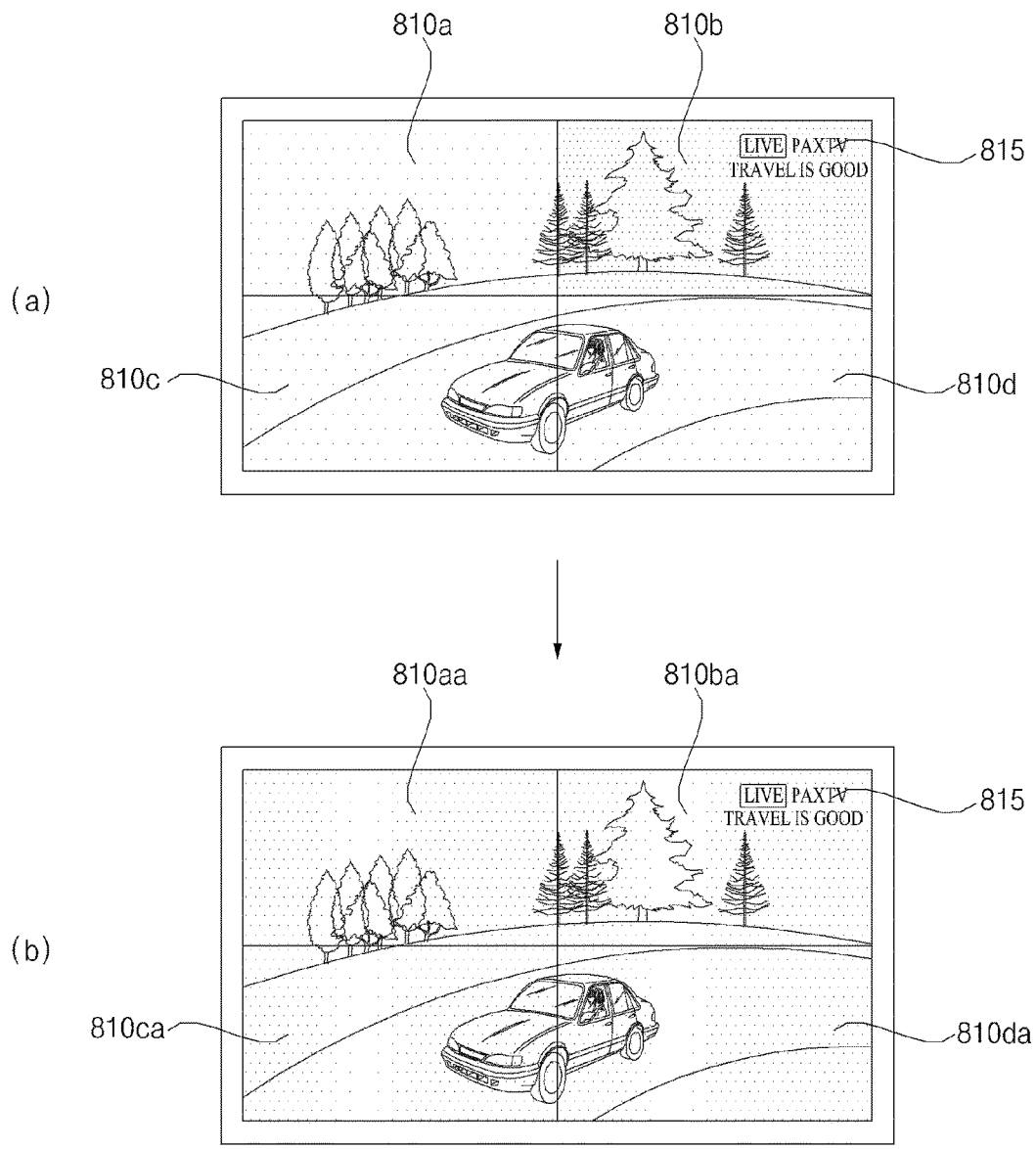
FIGS. 8a to 8b are views referred to for describing operation of the display apparatus of FIG. 7.
Figure 8B:
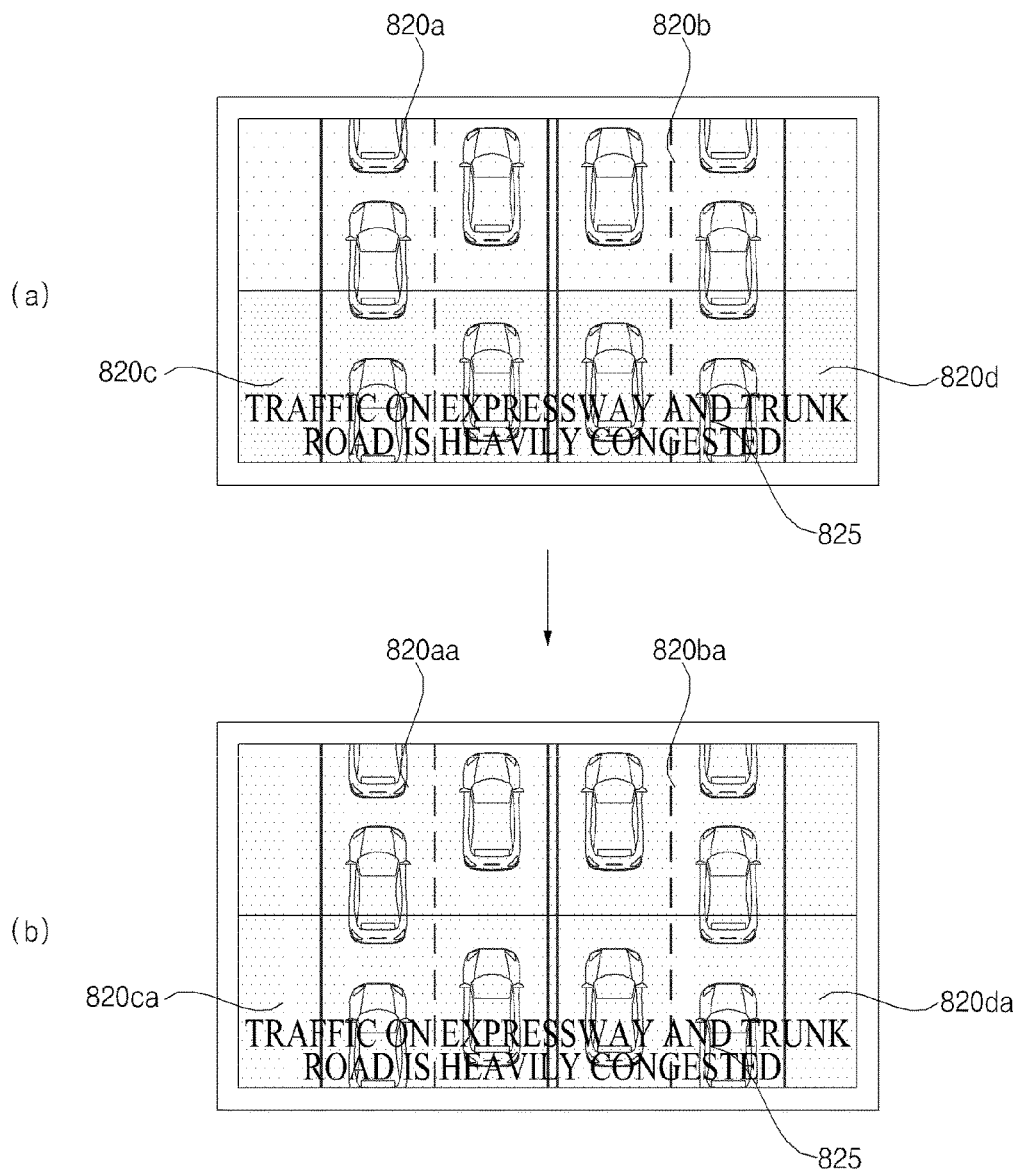

FIG. 7 is a flowchart illustrating a method of operating a display apparatus according to another embodiment of the present invention, and FIGS. 8a to 8b are views referred to for describing operation of the display apparatus of FIG. 7.

Referring to the figure, steps S710 to S720 of FIG. 7 are equal to steps S510 to 520 of FIG. 5 and a description thereof will thus be omitted.

Each of the plurality of controllers 170a to 170d determines whether a logo or text is included in some of the plurality of images (S730).

If the logo or text is included in some of the plurality of images, the luminance of the image including the logo or text and the luminance of another images may be different.

(a) of FIG. 8a shows the case where images 810a to 810d are displayed through the plurality of displays 180a to 180d and a logo 815 is included in the second images 810b displayed through the second display 180b.

It can be seen that the luminance of the second image 810b including the logo 815 is less than that of another images 820a, 820c and 820d.

(a) of FIG. 8b shows the case where images 810a to 810d are displayed through the plurality of displays 180a to 180d and text 825 is included in the third and fourth images 820c and 820d displayed through the third and fourth displays 180c and 180d.

It can be seen that the luminance of the third and fourth images 820c and 820d including the text 825 is less than that of another images 820a and 820b.

If the logo or text is included in some of the plurality of images, each of the plurality of controllers 170a to 170d may perform control to set the luminance of the image including the logo or text of the plurality of images and the luminance of the images which do not include the logo or text to the same luminance, that is, the first luminance, and to display the plurality of images with the first luminance (S740).

Each of the plurality of controllers 170a to 170d may perform control to increase the luminance of the second image 810ba including the logo 815 and to display the second image 810ba with the first luminance and the first, third and fourth images 810aa, 810ca and 810da with the first luminance through the first to fourth displays 180a to 180d, as shown in (b) of FIG. 8a.

In addition, each of the plurality of controllers 170a to 170d may perform control to increase the luminance of the third and fourth images 820ca and 820da including the text 825 and to display the third and fourth images 820ca and 820da with the first luminance and the first and second images 810aa and 810ba with the first luminance through the first to fourth displays 180a to 180d, as shown in (b) of FIG. 8b.

Therefore, it is possible to display the plurality of images with improved image quality.

Figure 9:
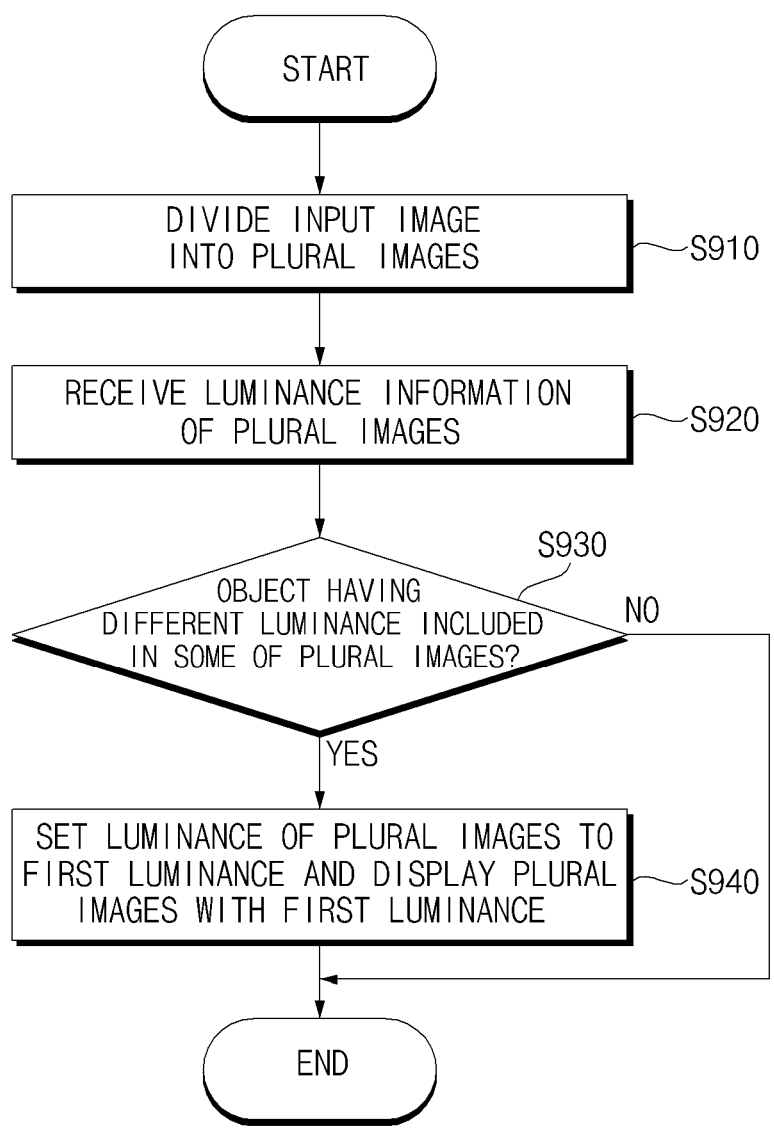
FIG. 9 is a flowchart illustrating a method of operating a display apparatus according to another embodiment of the present invention.
Figure 10A:
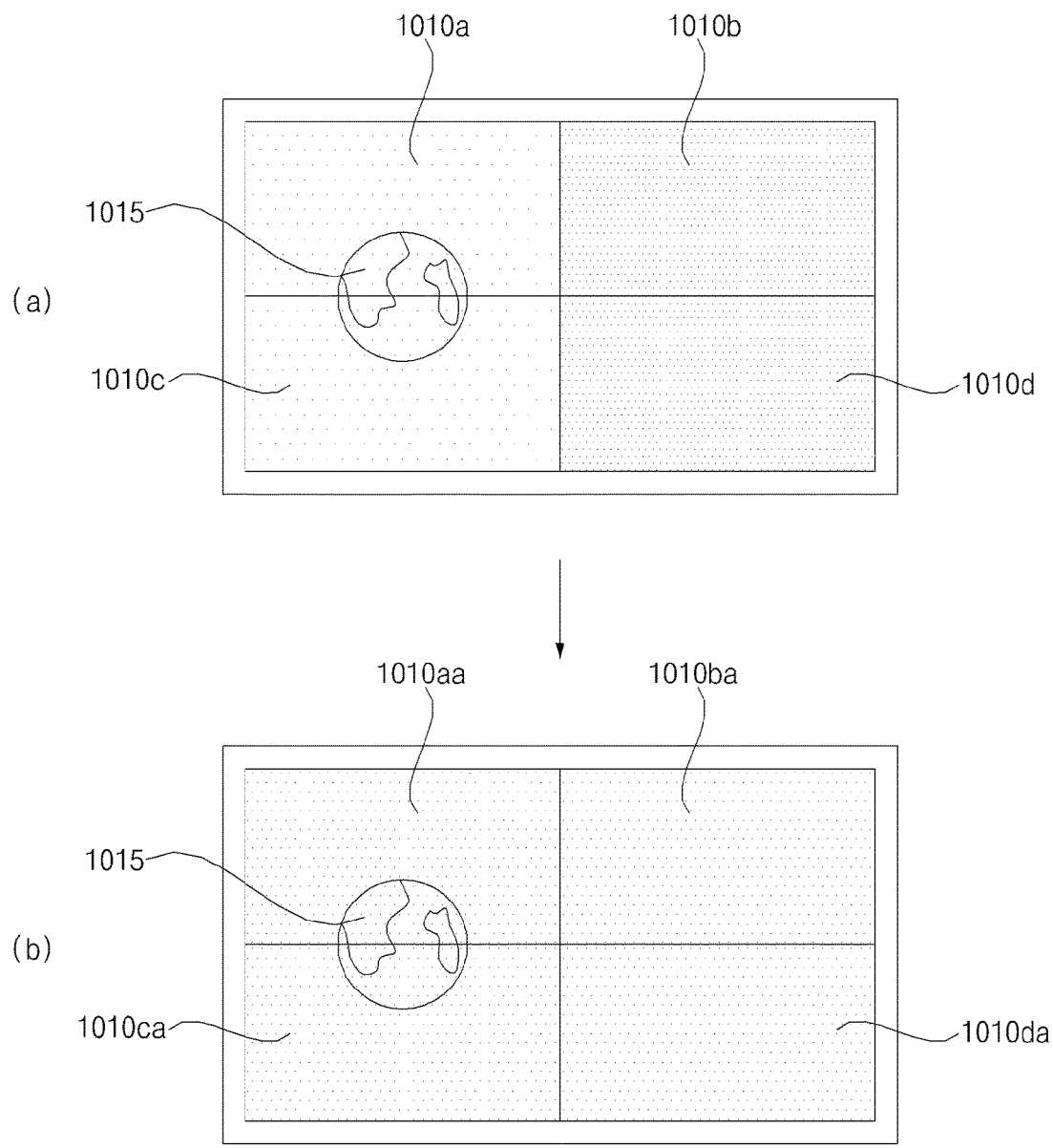
FIGS. 10a to 10b are views referred to for describing operation of the display apparatus according to another embodiment of the present invention.
Figure 10B:
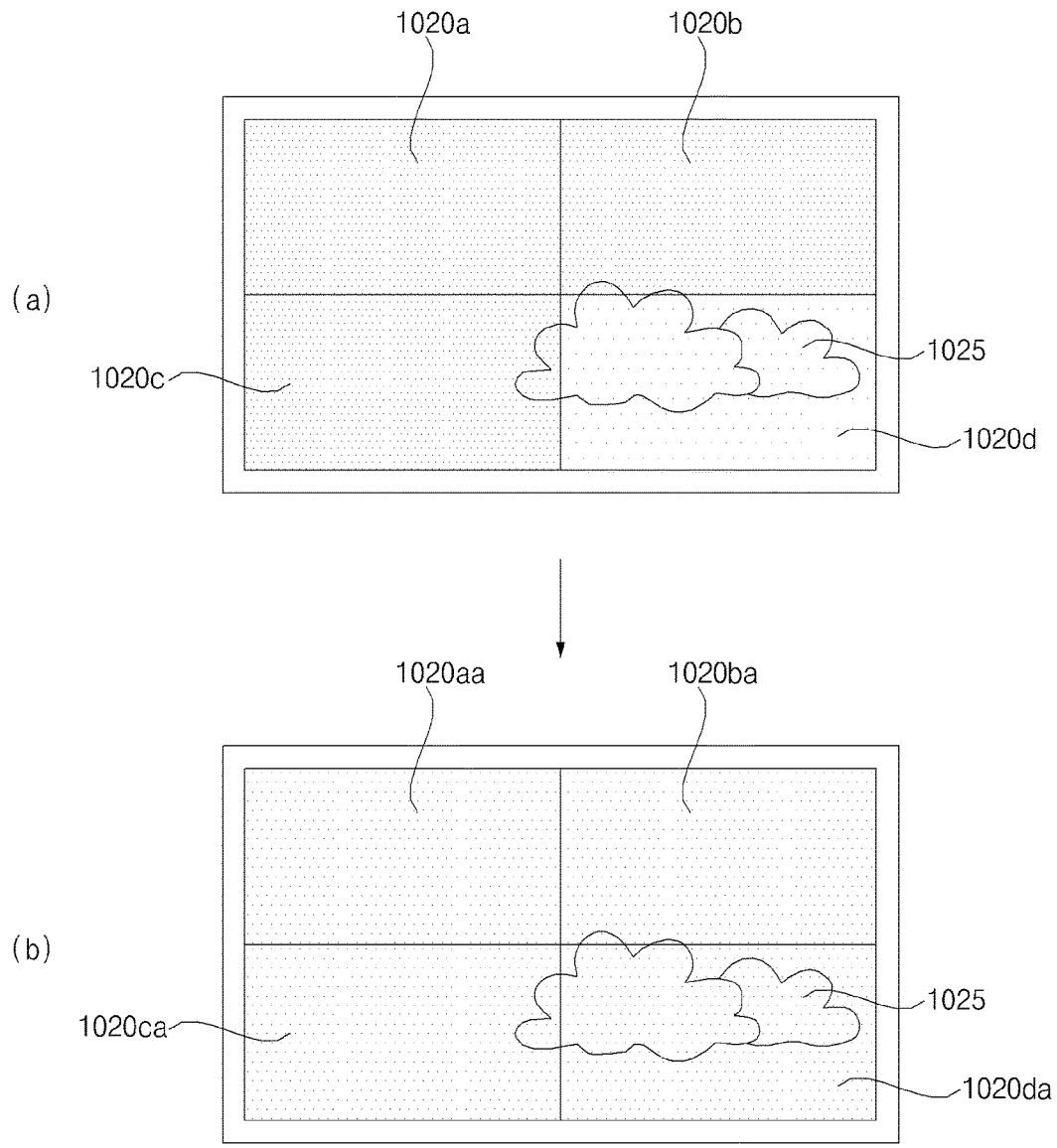

FIG. 9 is a flowchart illustrating a method of operating a display apparatus according to another embodiment of the present invention, and FIGS. 10a to 10b are views referred to for describing operation of the display apparatus according to another embodiment of the present invention.

Referring to the figure, steps S910 to S920 of FIG. 9 are equal to steps S510 to S520 of FIG. 5 and thus a description thereof will be omitted.

Each of the plurality of controllers 190a to 190d determines whether an object with luminance different from that of another images is included in an image (S930).

If the object having luminance different from that of another images is included in the image, the luminance of the image including the object and the luminance of another images are different.

(a) of FIG. 10a shows the case where images 1010a to 1010d are displayed through the plurality of displays 180a to 180d and the first and third images 1010a and 1010c displayed through the first and third displays 180a and 180c include an object 1015.

It can be seen that the luminance of the first and third images 1010a and 1010c including the object 1015 is less than that of another images 1010b and 1010d.

(a) of FIG. 10b shows the case where the images 1020a to 1020d are displayed through the plurality of displays 180a to 180d and the fourth image 1020d displayed through the fourth display 180d includes an object 1025.

It can be seen that the luminance of the fourth image 1020d including the object 1025 is less than that of another images 1020a, 1020b and 1020c.

If the object with luminance different from that of another images is included in some of the plurality of images, each of the plurality of controllers 190a to 190d may perform control to set the luminance of the image including the object with the luminance different from that of another images and the luminance of the images which do not include the object to the same luminance, that is, the first luminance, and to display the plurality of images with the first luminance (S940).

Each of the plurality of controllers 190a to 190d may perform control to increase the luminance of the first and third images 1010aa and 1010ca including the object 1015 and to display the first and third images 1010aa and 101ca with the first luminance and the second and fourth images 1010ba and 1010da with the first luminance through the first to fourth displays 180a to 180d, as shown in (b) of FIG. 10a.

Each of the plurality of controllers 190a to 190d may perform control to increase the luminance of the fourth image 1020da including the object 1025 and to display the fourth image 1020da with the first luminance and the first to third images 1020aa to 1020ca with the first luminance through the first to fourth displays 180a to 180d, as shown in (b) of FIG. 10b.

Therefore, it is possible to display the plurality of images with improved image quality.

Figure 11:
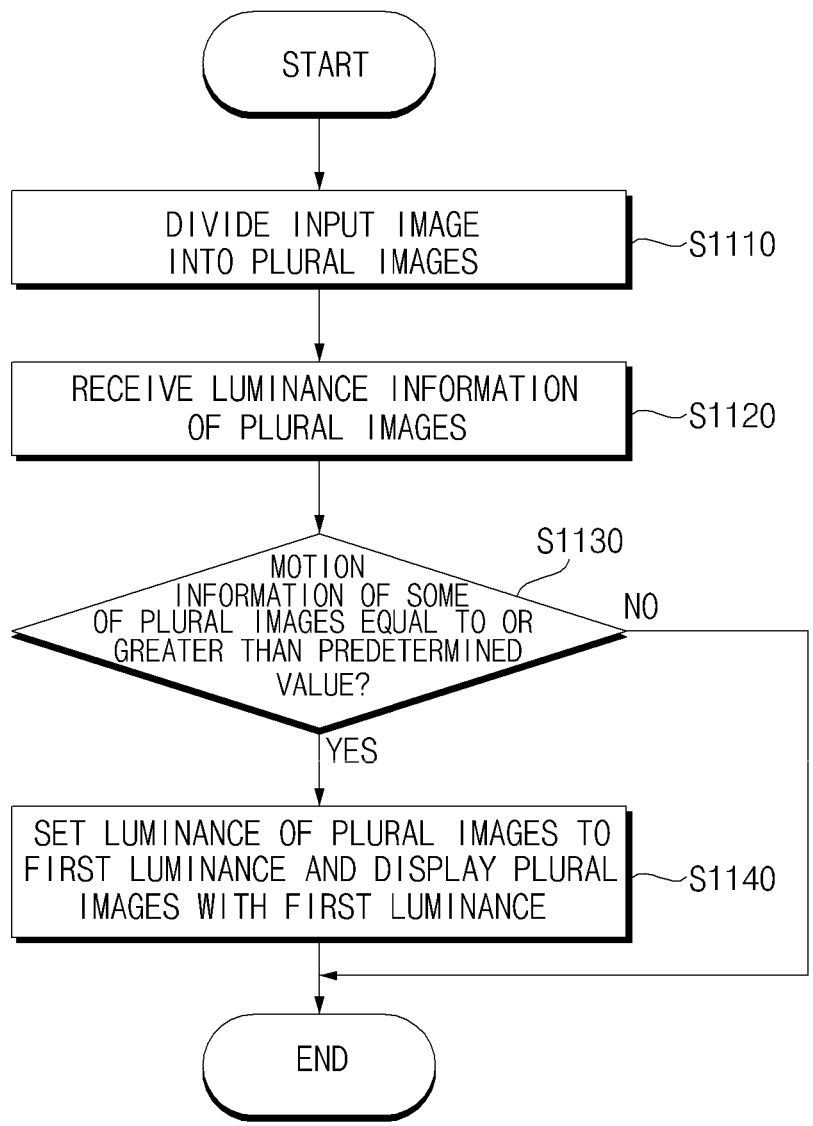
FIG. 11 is a flowchart illustrating a method of operating a display apparatus according to another embodiment of the present invention.
Figure 12A:
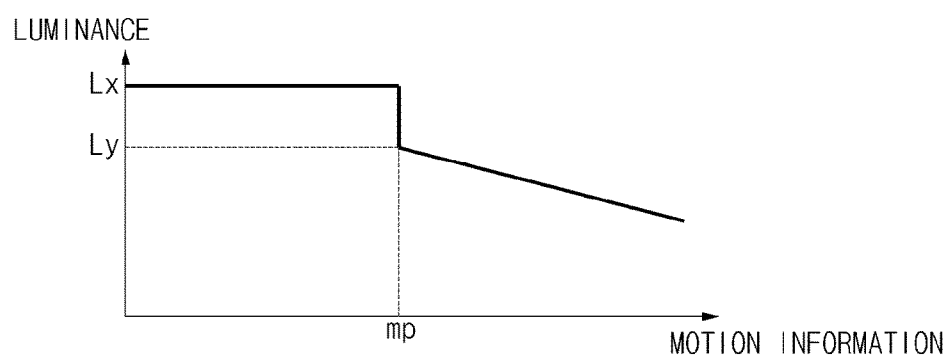
FIGS. 12a to 12c are views referred to for describing operation of the display apparatus according to another embodiment of the present invention.
Figure 12B:
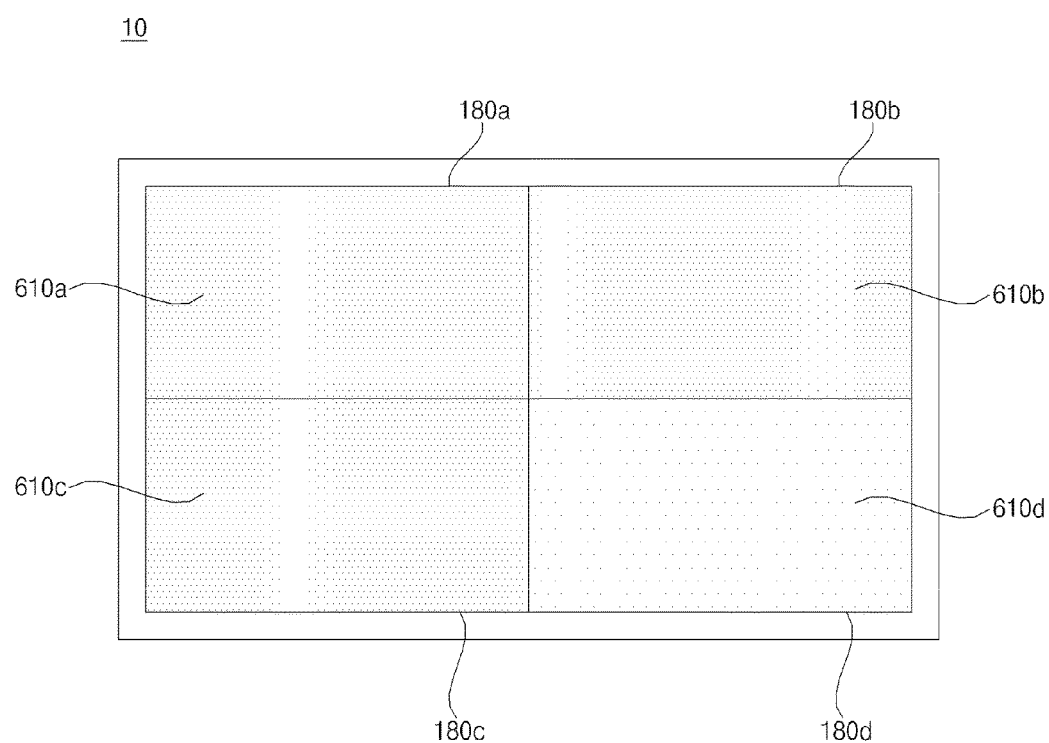
Figure 12C:
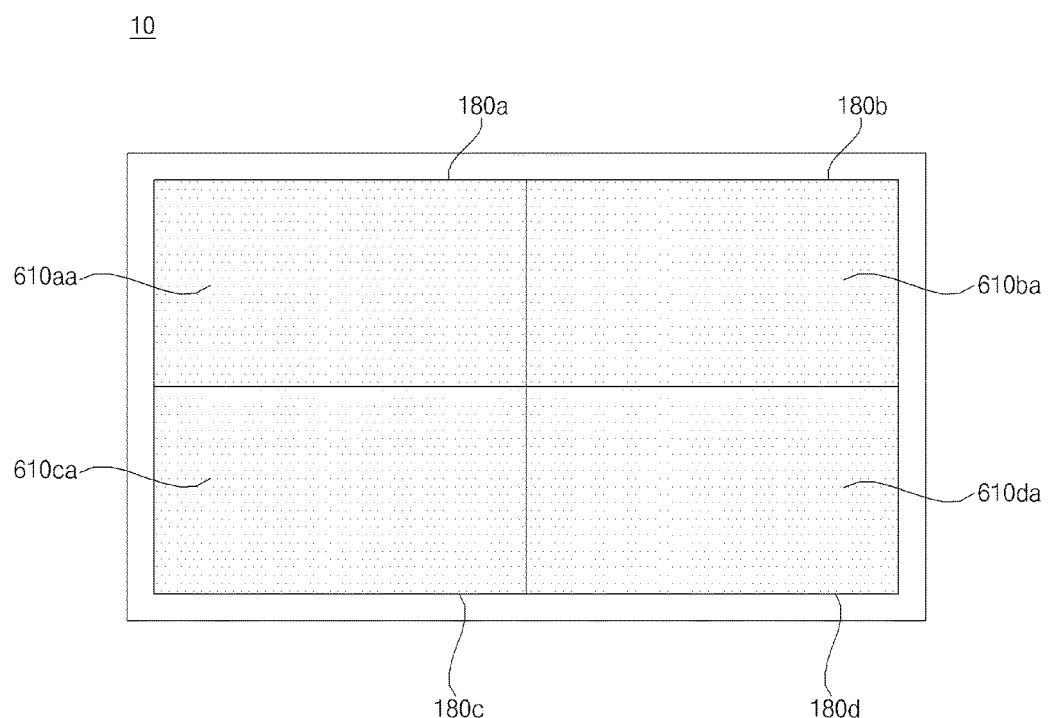

FIG. 11 is a flowchart illustrating a method of operating a display apparatus according to another embodiment of the present invention, and FIGS. 12a to 12c are views referred to for describing operation of the display apparatus according to another embodiment of the present invention.

Referring to the figure, steps S1110 to S1120 of FIG. 9 are equal to steps S510 to S520 of FIG. 5 and thus a description thereof will be omitted.

Each of the plurality of controllers 110a to 1110d determines whether motion information according to motion in the image is equal to or greater than a predetermined value (S1130).

If the motion information according to motion in some of the plurality of images is equal to or greater than the predetermined value, the luminance of the image having the motion information equal to or greater than the predetermined value and the luminance of another images may be different.

FIG. 12a shows change in luminance according to the level of the motion information.

Referring to the figure, upon displaying a moving image, the moving image with luminance Lx is displayed when there is a little motion, that is, when the motion information is less than the predetermined value mp and then the luminance Lx of the image may be gradually decreased as motion increases, that is, when the motion information is equal to or greater than the predetermined value mp, in order to reduce power consumption or easily view motion in the moving image.

For example, FIG. 12b shows the case where the motion information of the moving images 610a to 610c displayed through the first to third displays 180a to 180c is equal to or greater than a predetermined value mp and the motion information of the moving image 610d displayed through the fourth display 180d is less than the predetermined value mp.

If the motion information of some of the plurality of images is equal to or greater than the predetermined value, each of the plurality of controllers 1110a to 1110d may perform control to set the luminances of the plurality of images to the same luminance, that is, the first luminance, and to display the plurality of images with the first luminance (S1140).

Each of the plurality of controllers 1110a to 1110d may perform control to increase the luminances of the first and third images 610aa to 610ca as compared to FIG. 12b and to display the first and third images 610aa to 610ca with the first luminance and the fourth image 610da with the first luminance through the first to fourth displays 180a to 180d, as shown in FIG. 12c.

Therefore, it is possible to display the plurality of images with improved image quality.

Figure 13:
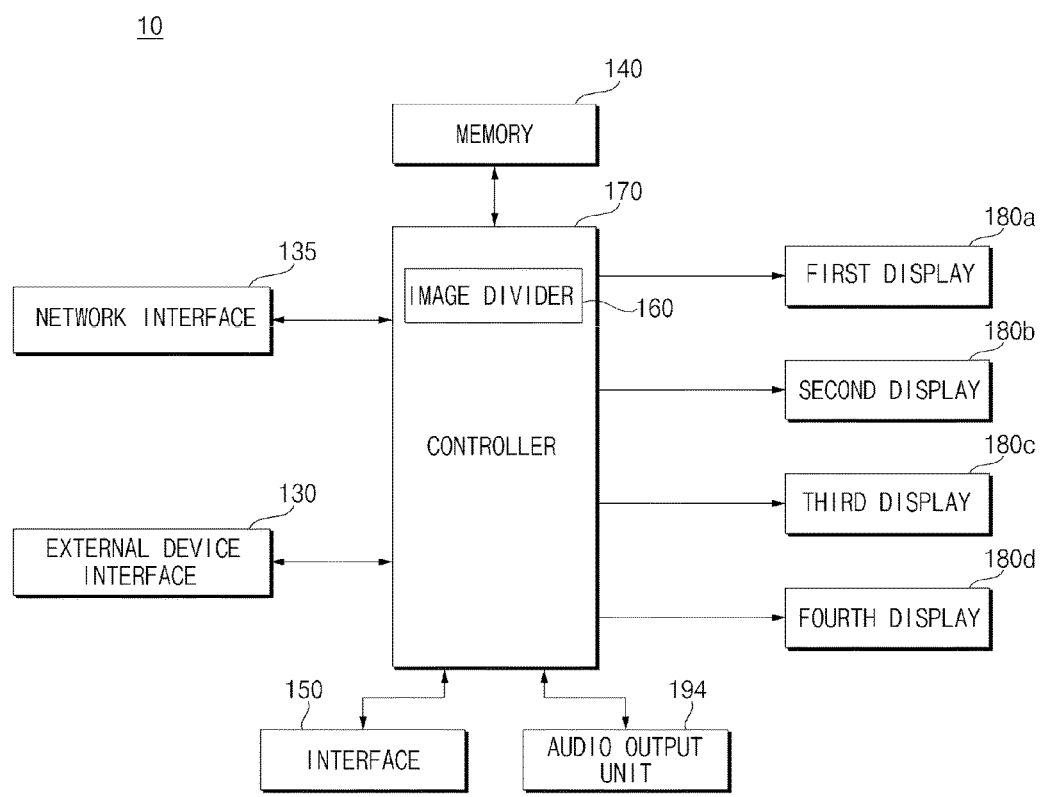
FIG. 13 is a block diagram showing another example of the internal configuration of the image display apparatus of FIG. 1.

FIG. 13 is a block diagram showing another example of the internal configuration of the image display apparatus of FIG. 1.

Referring to the figure, the display apparatus 10 may include an external device interface 130, a network interface 135, a memory 140, a controller 170, a plurality of displays 180a to 180d, a power supply 190, an audio output unit 194, a temperature sensor 191, a fan driving unit 197, etc.

The display apparatus 10 of FIG. 13 is different from the display apparatus 10 of FIG. 2 in that the plurality of displays 180a to 180d is controlled by one controller 170.

Meanwhile, the image divider 160 of FIG. 2 may be included in the controller 170 and the controller 170 may divide an input image into a plurality of images and scale the images, for displaying the input image through the plurality of displays 180a to 180d.

The controller 170 may calculate the luminance information of the divided images and perform control to display the images through the plurality of displays 180a to 180d with the same luminance based on the luminance information of the divided images.

In particular, if a difference between the minimum luminance of the first image of the plurality of images and the maximum luminance of the second image is equal to or greater than a reference value, the controller 170 may perform control to set the luminances of the plurality of images to the first luminance and to display the plurality of images with the first luminance.

A display apparatus according to an embodiment of the present invention includes a plurality of displays arranged adjacently, an image divider configured to divide an original input image into a plurality of sub-images for displaying the original input image split between the plurality of displays, wherein one or more of the plurality of sub-images corresponds to one or more still images and one or more of the plurality of sub-images corresponds to one or more moving images, and at least one controller configured to cause the one or more still images and the one or more moving images to be displayed with a first luminance value based on luminance values corresponding to the plurality of sub-images of each display of the plurality of displays.

In particular, it is possible to implement uniform luminance on the overall screen of the display apparatus.

The plurality of controllers corresponding to the plurality of displays may be included. The plurality of controllers may perform data communication with each other to share luminance information of the plurality of images, thereby setting the same luminance.

A display apparatus according to another embodiment of the present invention includes a plurality of displays arranged adjacently, an image divider configured to divide an original input image into a plurality of sub-images for displaying the original input image split between the plurality of displays, and at least one controller configured to cause the plurality of sub-images to be displayed with a first luminance value when a maximum variance between a first average luminance value of sub-images corresponding to a first display of the plurality of displays and a second average luminance value of sub-images corresponding to a second display of the plurality of displays is greater than or equal to a threshold reference value.

For example, when some of the plurality of images are still images and another images are moving images, the controller may perform control to set the images to the same luminance, thereby improving image quality of the display apparatus.

As another example, if a logo or text is included in some of the plurality of images and thus a luminance difference is equal to or greater than the reference value, the same luminance is set with respect to the plurality of images, thereby improving image quality of the display apparatus.

As another example, if an object having different luminance is included in some of the plurality of images and thus a luminance difference is equal to or greater than the reference value, the plurality of images is displayed with the same luminance, thereby improving image quality of the display apparatus.

As another example, if motion information of some of the plurality of images is equal to or greater than a predetermined value and a luminance difference is equal to or greater than the reference value, the plurality of images is displayed with the same luminance, thereby improving image quality of the display apparatus.

The display apparatus according to the present invention should not be limited to configurations and methods of the above-described embodiments, and all or some of the embodiments may be selectively combined with one another to achieve various alterations.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. Such modifications should not be individually understood from the technical spirit or prospect of the present invention.

What is claimed is:

1. A display apparatus comprising:
a plurality of displays arranged adjacently;
an image divider configured to divide an original input image into a plurality of sub-images for displaying the original input image split between the plurality of displays, wherein one or more of the plurality of sub-images corresponds to one or more still images and one or more of the plurality of sub-images corresponds to one or more moving images; and
at least one controller configured to:
determine corresponding average luminance values of each of the sub-images corresponding to each display of the plurality of displays; and
cause the one or more still images and the one or more moving images to be displayed with a first luminance value based on luminance values corresponding to the plurality of sub-images of each display of the plurality of displays when a maximum variance among the average luminance values is greater than or equal to a threshold reference value.

2. The display apparatus according to claim 1, wherein:
the at least one controller comprises a plurality of controllers corresponding to the plurality of displays; and
the plurality of controllers exchange luminance information of the corresponding plurality of sub-images.

3. The display apparatus according to claim 1, wherein:
the at least one controller comprises a plurality of controllers corresponding to the plurality of displays; and
a first controller of the plurality of controllers is configured to:
determine an average luminance value of a first sub-image received from the image divider;
cause the determined average luminance value to be provided to the plurality of controllers excluding the first controller; and
receive average luminance information of the plurality of sub-images excluding the first sub-image from the plurality of controllers excluding the first controller.

4. The display apparatus according to claim 1, wherein:
the at least one controller comprises a plurality of controllers each corresponding to a display of the plurality of displays; and
a first controller of the plurality of controllers is configured to:
increase a luminance level of a still image displayed on a first display of the plurality of displays during a first time period, wherein the luminance level of the still image is increased from an original still image luminance level to the first luminance level; and decrease a luminance level of a moving image displayed on the first display during a second time period following the first time period, wherein the luminance level of the moving image is decreased from an original moving image luminance level to the first luminance level.

5. The display apparatus according to claim 1, wherein the at least one controller is further configured to:
determine an average luminance value of the one or more moving images in the plurality of sub-images;
determine an average luminance value of the one or more still images in the plurality of sub-images; and
set a luminance value of the plurality of sub-images to the first luminance value which is less than the determined average luminance value of the one or more moving images when the determined average luminance value of the one or more moving images is greater than the determined average luminance value of the one or more still images.

6. The display apparatus according to claim 5, wherein the first luminance value is greater than the determined average luminance value of the one or more still images.

7. The display apparatus according to claim 6, wherein the at least one controller is further configured to:
cause the one or more still images to be displayed with a second luminance value before being displayed with the first luminance value, wherein the second luminance value is less than the first luminance value; and
cause the one or more moving images to be displayed with a third luminance value before being displayed with the first luminance value, wherein the third luminance value is greater than the first luminance value.

8. The display apparatus of according to claim 1, wherein:
the sub-images corresponding to a first display of the plurality of displays are moving images;
the sub-images corresponding to a sub-group of displays positioned adjacent to the first display are still images; and
the at least one controller is further configured to cause the sub-images corresponding to the sub-group of displays to be displayed with a graduated luminance increasing toward the first display,
wherein a first area within the sub-group of displays positioned distal from the first display is displayed with a second luminance value and a second area within the sub-group of displays positioned proximate to the first display is displayed with a third luminance value, wherein the second luminance value is less than the third luminance value and the third luminance value is less than the first luminance value.

9. A display apparatus comprising:
a plurality of displays arranged adjacently;
an image divider configured to divide an original input image into a plurality of sub-images for displaying the original input image split between the plurality of displays; and
at least one controller configured to:
cause the plurality of sub-images to be displayed with a first luminance value when a maximum variance between a first average luminance value of sub-images corresponding to a first display of the plurality of displays and a second average luminance value of sub-images corresponding to a second display of the plurality of displays is greater than or equal to a threshold reference value.

10. The display apparatus according to claim 9, wherein:
the at least one controller comprises a plurality of controllers corresponding to the plurality of displays, and
the plurality of controllers exchange luminance information of the corresponding plurality of sub-images.

11. The display apparatus according to claim 9, wherein:
the at least one controller comprises a plurality of controllers corresponding to the plurality of displays; and
a first controller of the plurality of controllers is configured to:
determine an average luminance value of a first sub-image received from the image divider;
cause the determined average luminance value to be provided to the plurality of controllers excluding the first controller; and
receive average luminance information of the plurality of sub-images excluding the first sub-image from the plurality of controllers excluding the first controller.

12. The display apparatus according to claim 9, wherein the sub-images corresponding to the first display are one or more still images and the sub-images corresponding to the second display are moving images.

13. The display apparatus according to claim 12, wherein:
the at least one controller comprises a plurality of controllers corresponding to the plurality of displays; and
a first controller of the plurality of controllers is configured to:
increase a luminance level of a still image displayed on a first display of the plurality of displays during a first time period, wherein the luminance level of the still image is increased from an original still image luminance level to the first luminance level; and
decrease a luminance level of a moving image displayed on the first display during a second time period following the first time period, wherein the luminance level of the moving image is decreased from an original moving image luminance level to the first luminance level.

14. The display apparatus according to claim 9, wherein the sub-images corresponding to the first display comprise a graphic display or text to be displayed in the sub-images.

15. The display apparatus according to claim 9, wherein the at least one controller is further configured to:
determine presence of an object to be displayed in the sub-images corresponding to the first display; and
determine the first average luminance value based on the determined presence of the object to be displayed.

16. The display apparatus according to claim 9, wherein the at least one controller is further configured to:
determine motion information to be displayed in the sub-images corresponding to the first display; and
determine the first average luminance value based on the determined motion information to be displayed.

17. The display apparatus according to claim 9, wherein the at least one controller is further configured to set the first luminance value to a value between a minimum luminance value of the sub-images corresponding to the first display and a maximum luminance value of the sub-images corresponding to the second display.

18. The display apparatus according to claim 9, wherein the at least one controller is further configured to set the first luminance value to a minimum luminance value of the sub-images corresponding to the first display.

19. The display apparatus of according to claim 9, wherein:
the sub-images corresponding to the first display of the plurality of displays are moving images;
the sub-images corresponding to a sub-group of displays positioned adjacent to the first display are still images; and
the at least one controller is further configured to cause the sub-images corresponding to the sub-group of displays to be displayed with a graduated luminance increasing toward the first display,
wherein a first area within the sub-group of displays positioned distal from the first display is displayed with a second luminance value and a second area within the sub-group of displays positioned proximate to the first display is displayed with a third luminance value, wherein the second luminance value is less than the third luminance value and the third luminance value is less than the first luminance value.

* * * * *